US008363555B2

(12) United States Patent
Bouchard

(10) Patent No.: US 8,363,555 B2
(45) Date of Patent: Jan. 29, 2013

(54) MONITORING INTERNET PROTOCOL (IP) TELEPHONY SIGNALING LINKS

(75) Inventor: Luc A. Bouchard, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 568 days.

(21) Appl. No.: 11/552,568

(22) Filed: Oct. 25, 2006

(65) Prior Publication Data

US 2008/0101247 A1 May 1, 2008

(51) Int. Cl.
G01R 31/08 (2006.01)

(52) U.S. Cl. ...................................................... 370/242

(58) Field of Classification Search .................. None
See application file for complete search history.

(56) References Cited

U.S. PATENT DOCUMENTS

| 5,438,570 | A | * | 8/1995 | Karras et al. | 370/426 |
|---|---|---|---|---|---|
| 5,757,810 | A | * | 5/1998 | Fall | 714/704 |
| 5,943,604 | A | * | 8/1999 | Chen et al. | 455/3.06 |
| 6,272,127 | B1 | * | 8/2001 | Golden et al. | 370/352 |
| 6,317,596 | B1 | * | 11/2001 | Elwin | 455/423 |
| 6,452,924 | B1 | * | 9/2002 | Golden et al. | 370/352 |
| 6,557,112 | B1 | * | 4/2003 | Shimada | 714/4.1 |
| 6,625,764 | B1 | * | 9/2003 | Dawson | 714/715 |
| 6,628,641 | B1 | * | 9/2003 | Strawczynski et al. | 370/349 |
| 6,675,243 | B1 | * | 1/2004 | Bastiani et al. | 710/105 |
| 6,909,741 | B1 | * | 6/2005 | Smith et al. | 375/222 |
| 7,315,554 | B2 | * | 1/2008 | Baum et al. | 370/469 |
| 7,356,599 | B2 | * | 4/2008 | Pochon et al. | 709/229 |
| 2001/0049263 | A1 | * | 12/2001 | Zhang | 455/67.1 |
| 2002/0118671 | A1 | * | 8/2002 | Staples et al. | 370/352 |
| 2002/0157024 | A1 | * | 10/2002 | Yokote | 713/201 |
| 2003/0048793 | A1 | * | 3/2003 | Pochon et al. | 370/401 |
| 2004/0058710 | A1 | * | 3/2004 | Timmins et al. | 455/560 |
| 2004/0205237 | A1 | * | 10/2004 | Doshi et al. | 709/241 |
| 2005/0002400 | A1 | * | 1/2005 | Karol et al. | 370/394 |
| 2005/0091304 | A1 | * | 4/2005 | Trayler | 709/200 |
| 2006/0088063 | A1 | * | 4/2006 | Hartung et al. | 370/498 |
| 2006/0168326 | A1 | * | 7/2006 | Baldwin et al. | 709/238 |
| 2006/0182036 | A1 | * | 8/2006 | Sasagawa et al. | 370/242 |
| 2006/0203807 | A1 | * | 9/2006 | Kouretas et al. | 370/352 |
| 2007/0002897 | A1 | * | 1/2007 | Goshen et al. | 370/468 |
| 2007/0076603 | A1 | * | 4/2007 | MeLampy et al. | 370/229 |
| 2008/0095058 | A1 | * | 4/2008 | Dalmases et al. | 370/237 |

OTHER PUBLICATIONS

Adax, "Telephony Transport for SS7 Over IP," SCTP/T, http://www.adax.com/products/protocol-software/99-sctp_t.htm, 3 pages, Printed Jul. 25, 2006.
Adax, "APS-SCT.T—Telephony Transport for SS7 Over IP," Data Sheet of Software, 2 pages.
"Voicemail," Zeacom, http://web.archive.org/web/20030116122246/http:/www.zeacom.com/solutions/messaging/voicemail.html, downloaded Sep. 9, 2010, 2002.
Hyatt, Michael, "A Better Voice Mail Greeting," Working Smart, The Alternative to Working Hard, http://web.archiv.org/web/20040707233246/http:/michaelhyatt.blogs.com/workingsmart/2004/07/a_better_voice_1.html; downloaded 09-09-210, Jul. 4, 2004.

* cited by examiner

Primary Examiner — Ayaz Sheikh
Assistant Examiner — Faiyazkhan Ghafoerkhan
(74) Attorney, Agent, or Firm — Baker Botts L.L.P.

(57) ABSTRACT

In one embodiment, a method includes, at an endpoint, receiving signaling packets from a network coupled to the network. The method also includes, at the endpoint, detecting faults in the signaling packets received at the interface. The method also includes, from the endpoint, reporting the faults to a call agent residing at a server coupled to the network.

28 Claims, 1 Drawing Sheet

MONITORING INTERNET PROTOCOL (IP) TELEPHONY SIGNALING LINKS

TECHNICAL FIELD

The present disclosure relates generally to Internet Protocol (IP) telephony.

BACKGROUND

A network supporting IP telephony typically relies on signaling links to control functionality at endpoints coupled to the network. The quality of the signaling links tends to be a significant factor in the quality of the user experience at the endpoints. Troubleshooting problems in the signaling links is usually reactive, dependent on monitoring provided by probes and measurements external to the endpoints, and noncontinuous. Moreover, typical monitoring capabilities are inexhaustive, e.g., they do not monitor all signaling links all the time.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Figure 1:
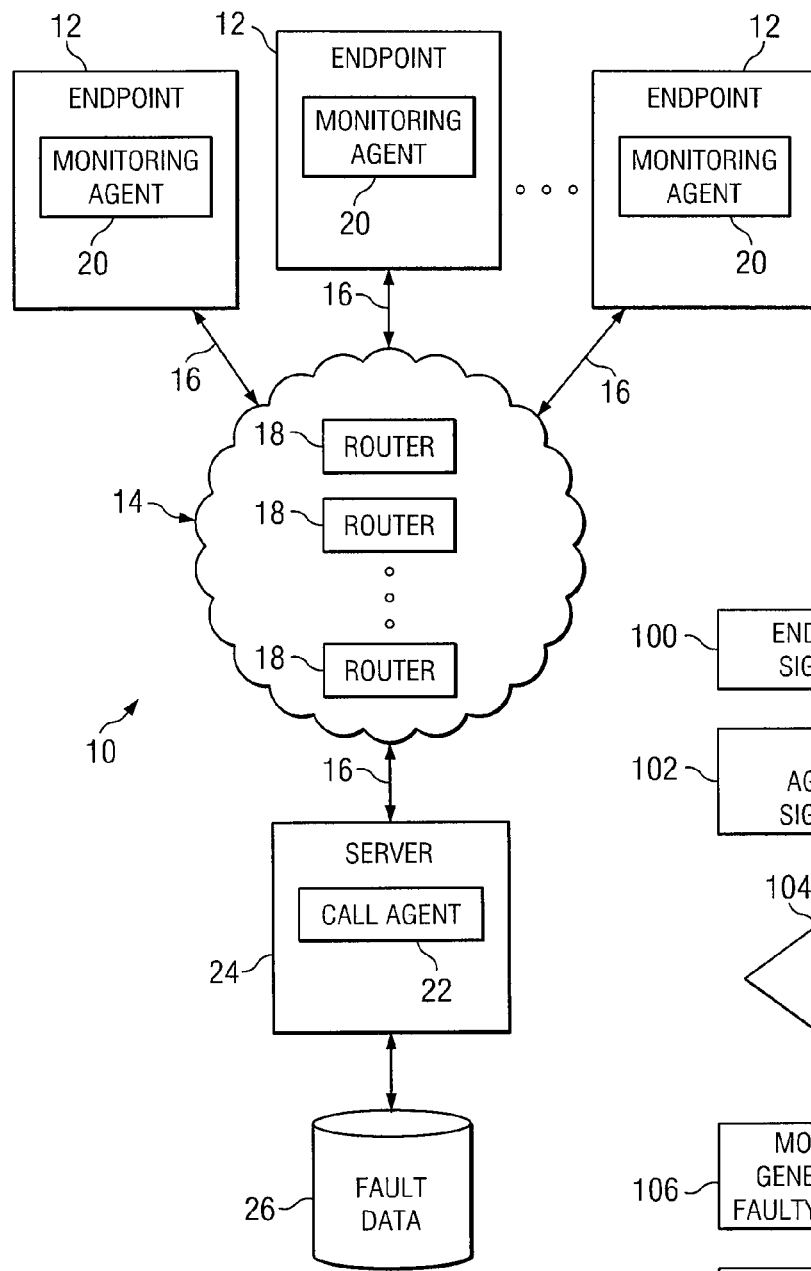
FIG. 1 illustrates an example system for monitoring IP telephony signaling links.

FIG. 1 illustrates an example system 10 for monitoring IP telephony signaling links. System 10 includes endpoints 12 that communicate via network 14. In particular embodiments, network 14 is a local area network (LAN), a wide area network (WAN), a metropolitan area network (MAN), a portion of the Internet, or another network 14 or a combination of two or more such networks 14. In particular embodiments, network 14 has one or more connections to one or more other networks 14, such as, for example, the Public Switched Telephone Network (PSTN). The present invention contemplates any suitable network 14.

One or more links 16 couple each of one or more endpoints 12 to network 14. In particular embodiments, one or more links 16 each include one or more wireline, wireless, or optical links 16. In particular embodiments, one or more links 16 each include a LAN, a WAN, a MAN, a portion of the Internet, a portion of the PSTN, an access network, or another link 16 or a combination of two or more such links 16. The present invention contemplates any suitable links 16 coupling and suitable endpoints 12 to any suitable network 14.

In particular embodiments, endpoints 12 enable users at endpoints 12 to communicate with each other. As an example and not by way of limitation, an endpoint 12 may be an IP telephone, telephony software on a computer system, a gateway, a video terminal, a digital signal processing (DSP) resource (such as a conference bridge), a transcoder, a Reservation Protocol (RSVP) agent, a music-on-hold server, a computer telephony integration (CTI) endpoint, a call agent, or another endpoint 12 or a combination of two more such endpoints 12. The present invention contemplates any suitable endpoints 12. Herein, an endpoint 12 need not be a final destination of a communication, but may be an intermediate destination (such as a such as a Layer 3 router, a Layer 2 switch, a firewall, or a gateway) along a network path to the final destination.

Network 14 communicates packets (which, in particular embodiments, are IP packets) to and from endpoints 12. As an example and not by way of limitation, network 14 may communicate one or more bearer packets including voice data between a first endpoint 12 and a second endpoint 12 for a telephone call between first endpoint 12 and second endpoint 12. The present invention contemplates any suitable bearer packets. As another example, network 14 may communicate to an endpoint 12 one or more signaling packets including signaling data directing functionality at endpoint 12. The present contemplates any suitable signaling packets including any suitable signaling data. As an example and not by way of limitation, network 14 may communicate to an endpoint 12 one or more signaling packets including signaling data for establishing or terminating a telephone call involving endpoint 12. In particular embodiments, signaling packets communicated to endpoints 12 originate from one or more servers coupled to network 10 that provide centralized management of functionality at endpoints 12.

Routers 18 communicate packets through network 14 toward their destinations. As an example and not by way of limitation, a first router 18 may receive a packet from a second router 18, compare a destination address of the packet with a routing or other table at first router 18 to determine a third router 18 for communicating the packet toward its destination, and communicate the packet to third router 18. Reference to a router 18 encompasses a Layer 3 router, a Layer 2 switch, a gateway, or other router 18 or a combination of two or more such routers 18. In particular embodiments, one or more links 16 (which may each include one or more wireline, wireless, or optical links 16) couple two or more routers 18 to each other. The present invention contemplates any suitable links 16 coupling routers 18 to each other. In particular embodiments, network 14 includes one or more network topologies. As an example and not by way of limitation, one or more portions of network 14 may include routers 18 that connect to each other according to a ring-based network topology. One or more portions of network 14 may include routers 18 that connect to each other according to a mesh-based network topology, a star-based network topology, a tree-based network topology, a bus network topology, a line-based network topology, or another network topology or a combination of two or more such network topologies. The present invention contemplates any suitable network topologies.

One or more endpoints 12 each include a monitoring agent 20. In particular embodiments, a monitoring agent 20 is a hardware, software, or embedded logic component or a combination of two or more such components for monitoring signaling packets received at endpoint 12. If monitoring agent 20 detects one or more faults in a signaling packet received at endpoint 12, monitoring agent 20 reports the faults to call agent 22 at server 24. In particular embodiments, a fault in a signaling packet received at endpoint 12 suggests one or more faults in the network path that communicated the signaling packet to endpoint 12. As an example and not by way of limitation, the fault in the signaling packet may be a result of a malfunction at a router 18 in the network path. The fault in the signaling packet may suggest a malfunction at one or more routers 18 in the network path that communicated the signaling packet to endpoint 12. In particular embodiments, a fault in a signaling packet is possibly a result of a malfunction, a misconfiguration, a policy, or one or more network conditions. As an example and not by way of limitation, a fault in a signaling packet may be a result of, a software bug at a router 18, a router 18 misconfigured to re-mark QoS classifications, a WAN service provider re-marking the QoS classifications of signaling packets in response to network traffic reaching or exceeding a predetermined volume, or a network offered load higher than certain thresholds forcing the re-marking of certain flows.

In particular embodiments, a signaling packet that has an improper label or categorization is faulty. As an example and not by way of limitation, a signaling packet may include Layer 3 information (such as, for example, an IP header) and Layer 2 information (such as, for example, information indicating a quality of service (QoS) classification of the signaling packet). If the Layer 3 information does not agree with particular reference data at endpoint 12, the signaling packet may be faulty. Similarly, if the Layer 2 information does not agree with particular reference data at endpoint 12, the signaling packet may be faulty. The present invention contemplates any suitable faults in signaling packets. In particular embodiments, to detect one or more faults in a signaling packet received at endpoint 12, monitoring agent 20 compares Layer 3 information in the signaling packet, Layer 2 information in the signaling packet, or both with reference data at endpoint 12 to determine whether the Layer 3 information, Layer 2 information, or both agree with the reference data. As an example and not by way of limitation, the reference data may identify one or more proper IP headers, one or more proper QoS classifications, or both. Monitoring agent 20 may compare the IP header of the signaling packet, the QoS classification of the signaling packet, or both with the reference data and, if the IP header is not a proper one or the QoS classification is not a proper one, determine that the signaling packet is faulty. The present invention contemplates any suitable technique for detecting one or more faults in a signaling packet.

In particular embodiments, endpoints 12 are each a signaling probe monitoring the actual, live traffic, which substantially obviates reliance on the injection of monitoring-packet traffic into network 14. In particular embodiments, a 20,000-phone system is a 20,000-probe system for monitoring and reporting on the handling of signaling packets in network 14. In particular embodiments, such monitoring capability is available even where signaling links are not implemented according to Internet Engineering Task Force (IETF) QoS classification best practices requiring a differentiated services code point (DSCP) value of 24 (or per-hop behavior (PHB) of Class Selector 3 (CS3)) for signaling packets.

In particular embodiments, to report one or more detected faults to call agent 22, monitoring agent 20 communicates a report to call agent 22 that includes information on the faults. As an example and not by way of limitation, a report from monitoring agent 20 to call agent 22 may indicate that a faulty signaling packet arrived at endpoint 12. Monitoring agent 20 may communicate such a report every time a faulty signaling packet arrives at endpoint 12. The report may indicate the date and time of the report, the date and time of arrival of the faulty signaling packet, or both. A report from monitoring agent 20 to call agent 22 may indicate that at least one faulty signaling packet has arrived at endpoint 12 since a last report from monitoring agent 20. Monitoring agent 20 may communicate such a report on a hourly or other basis, according to particular needs. A report from monitoring agent 20 to call agent 22 may indicate the number of faulty signaling packets that have arrived at endpoint 12 since a last report from monitoring agent 20. The report may indicate the date and time of arrival of each of the faulty signaling packets. A report from monitoring agent 20 to call agent 22 may indicate the number of signaling packets retransmitted to endpoint 12 since a last report from monitoring agent 20. A report from monitoring agent 20 to call agent 22 may indicate the number faulty signaling packets received at endpoint 12, the number of signaling packets retransmitted to endpoint 12, or both over the course of a telephone call involving endpoint 12. Monitoring agent 20 may communicate the report at the end of the telephone call. In particular embodiments, a report from monitoring agent 20 to call agent 22 that indicates the occurrence of a fault also identifies the fault. As an example and not by way of limitation, if the fault is a disagreement between reference data at endpoint 12 and Layer 3 information in a signaling packet, Layer 2 information in the signaling packet or both, the report may specify the Layer 3 information, the Layer 2 information, or both that constitute the fault. The present invention contemplates monitoring agents 20 communicating any suitable reports to call agent 22 including any suitable information on any suitable faults in any suitable signaling packets.

In particular embodiments, monitoring agent 20 uses quiescent, preexisting signaling-link integrity traffic to communicate fault reports to call agent 22. As an example and not by way of limitation, monitoring agent 20 may attach a fault report to a keepalive, heartbeat, or other message from endpoint 12 to server 24. As another example, monitoring agent 20 may put a fault report into a keepalive, heartbeat, or other message from endpoint 12 to server 24. In particular embodiments, monitoring agent 20 communicates fault reports to call agent 22 independent of keepalive, heartbeat, or other messages.

Call agent 22 resides at a server 24 coupled to network 14. In particular embodiments, call agent 22 is a hardware, software, or embedded logic component or a combination of two or more such components for handling reports from monitoring agents 20. As an example and not by way of limitation, call agent 22 may receive a report from a monitoring agent 20 at an endpoint 12 and record information supplied by the report. Call agent 22 may record the date and time of the report. Call agent 22 may record the date and time of arrival of each of one or more faulty signaling packets identified in the report. Call agent 22 may record an IP address or other identifier of endpoint 12. Call agent 22 may record an IP address of each of one or more faulty signaling packets identified in the report. The present invention contemplates call agent 22 recording any suitable information supplied by any suitable reports from monitoring agents 20.

Fault data 26 includes information recorded by call agent 22 supplied by reports from monitoring agents 20. In particular embodiments, fault data 26 resides at a dedicated database. In particular embodiments, fault data 26 includes call detail records (CDRs). In particular embodiments, to record information supplied by a report from a monitoring agent 20, call agent 22 writes the information to one or more tables or other data structures. In particular embodiments, to record information supplied by a report from a monitoring agent 20, call agent 22 writes the information to one or more CDRs or other files. The present invention contemplates call agent 22 recording information supplied by reports from monitoring agents 20 in any suitable manner. In particular embodiments, faults data 26 is manipulable to logically reconstruct network conditions encountered by signaling packets. In particular embodiments, a logical reconstruction of the network conditions encountered by signaling packets facilitates an analysis of faults in network 14.

Figure 2:
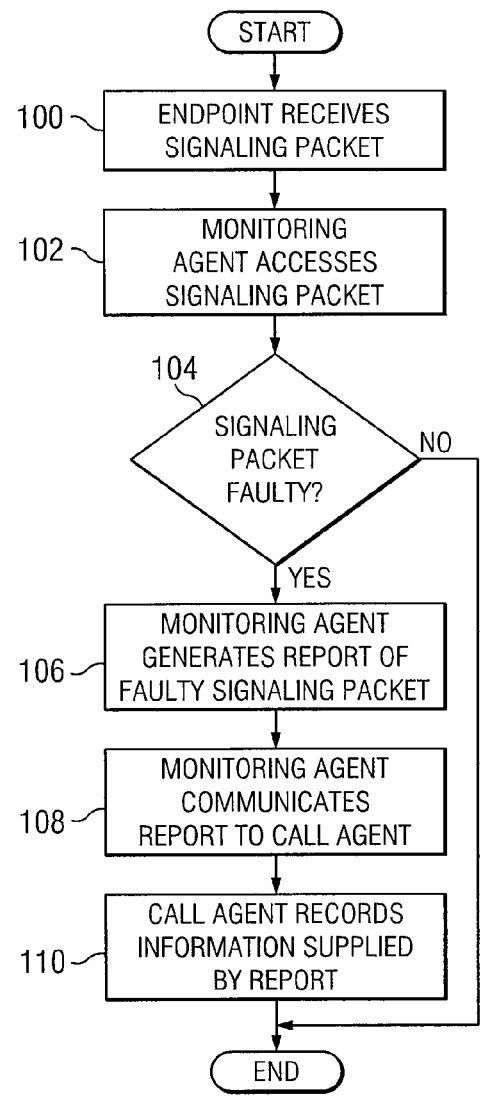
FIG. 2 illustrates an example method for monitoring IP telephony signaling links.

FIG. 2 illustrates an example method for monitoring IP telephony signaling links. The method begins at step 100, where an endpoint 12 receives a signaling packet. At step 102, a monitoring agent 20 at endpoint 12 accesses the signaling packet. At step 104, monitoring agent 20 determines whether the signaling packet includes one or more faults, as described above, and if the signaling packet includes one or more faults the method proceeds to step 106. At step 106, monitoring agent 20 generates a report of the one or more faults in the signaling packet. At step 108, monitoring agent 20 communicates the report to call agent 22. At step 110, call agent 22 records information supplied by the report, as described above, at which point the method ends. At step 104, if the signaling packet does not include one or more faults, the method ends. Although particular steps in the method illustrated in FIG. 2 have been illustrated and described as occurring in a particular order, the present invention contemplates any suitable steps of the method illustrated in FIG. 2 occurring in any suitable order.

Particular embodiments have been used to describe the present invention, and a person having skill in the art may comprehend one or more changes, substitutions, variations, alterations, or modifications within the scope of the appended claims. The present invention encompasses all such changes, substitutions, variations, alterations, and modifications.

What is claimed is:

1. An apparatus comprising:
   an interface at an endpoint coupled to a network, the interface operable to receive signaling packets from the network, wherein the signaling packets comprise Layer 3 data or Layer 2 data, the Layer 3 data comprising Internet Protocol (IP) headers, the Layer 2 data indicating quality of service (QoS) classifications of the signaling packets; and
   a monitoring agent at the endpoint coupled to the interface, the monitoring agent operable to:
      compare one or more portions of the Layer 3 data or the Layer 2 data in the signaling packets with reference data residing at the endpoint prior to receipt of the signaling packets, the reference data comprising one or more portions of one or more proper IP headers or proper QoS classifications;
      determine whether one or more of the portions of the Layer 3 data or the Layer 2 data in the signaling packets deviate from the reference data residing at the endpoint; and
      if one or more of the portions of the Layer 3 data or the Layer 2 data in the signaling packets deviate from the reference data at the endpoint, then report to a call agent residing at a server coupled to the network the one or more deviations as one or more signaling-packet faults in the signaling packets, the signaling-packet faults in the signaling packets suggesting one or more network-path faults in a network path that communicated the signaling packets to the interface.

2. The apparatus of claim 1, wherein the endpoint is an Internet Protocol (IP) telephone.

3. The apparatus of claim 1, wherein the endpoint is a Layer 3 router.

4. The apparatus of claim 1, wherein the Layer 2 data comprises an 802.1Q/p header.

5. The apparatus of claim 1, wherein the report to the call agent indicates occurrence of the deviations without identifying the deviations from the reference data.

6. The apparatus of claim 1, wherein the report indicates a number of faulty signaling packets received at the interface over the course of a period of time preceding the report.

7. The apparatus of claim 1, wherein the report indicates a number of faulty signaling packets received at the interface over the course of a call that recently ended.

8. The apparatus of claim 1, wherein the monitoring agent is operable to report the signaling-packet faults in keep-alive messages to the call agent.

9. A method comprising:
   at an endpoint, receiving signaling packets from a network coupled to the endpoint, wherein the signaling packets comprise Layer 3 data or Layer 2 data, the Layer 3 data comprising Internet Protocol (IP) headers, the Layer 2 data indicating quality of service (QoS) classifications of the signaling packets;
   at the endpoint, comparing one or more portions of the Layer 3 data or the Layer 2 data in the signaling packets with reference data residing at the endpoint prior to receipt of the signaling packets, the reference data comprising one or more portions of one or more proper IP headers or proper QoS classifications;
   at the endpoint, determining whether one or more of the portions of the Layer 3 data or the Layer 2 data in the signaling packets deviate from the reference data residing at the endpoint; and
   at the endpoint, if one or more of the portions of the Layer 3 data or the Layer 2 data in the signaling packets deviate from the reference data at the endpoint, then reporting to a call agent residing at a server coupled to the network the one or more deviations as one or more signaling-packet faults in the signaling packets, the signaling-packet faults in the signaling packets suggesting one or more network-path faults in a network path that communicated the signaling packets to the interface.

10. The method of claim 9, wherein the endpoint is an Internet Protocol (IP) telephone.

11. The method of claim 9, wherein the endpoint is a Layer 3 router.

12. The method of claim 9, wherein the Layer 2 data comprises an 802.1Q/p header.

13. The method of claim 9, wherein the report to the call agent indicates occurrence of the deviations without identifying the deviations from the reference data.

14. The method of claim 9, wherein the report indicates a number of faulty signaling packets received at the interface over the course of a period of time preceding the report.

15. The method of claim 9, wherein the report indicates a number of faulty signaling packets received at the interface over the course of a call that recently ended.

16. The method of claim 9, wherein reporting the signaling-packet faults to the call agent comprises reporting the signaling-packet faults in keep-alive messages to the call agent.

17. An apparatus comprising:
   an interface at a server coupled to a network, the interface operable to receive from a plurality of endpoints coupled to the network reports of signaling-packet faults in signaling packets received at the endpoints, the signaling packets comprising Layer 3 data or Layer 2 data, the Layer 3 data comprising Internet Protocol (IP) headers, the Layer 2 data indicating quality of service (QoS) classifications of the signaling packets, the reports indicating deviations of one or more portions of the Layer 3 data or the Layer 2 data in the signaling packets from reference data residing at the endpoints prior to receipt of the signaling packets, the reference data comprising one or more portions of one or more proper IP headers or proper QoS classifications, the signaling-packet faults in the signaling packets suggesting one or more network-path faults in a network path that communicated the signaling packets to the interface; and
   a call agent at the server, the call agent operable to:

access the reports;
generate a record of the signaling-packet faults from the reports; and
communicate the record of the signaling-packet faults to a memory coupled to the call agent; and
the memory, operable to store the record of the signaling-packet faults for analysis.

18. The apparatus of claim 17, wherein one or more of the endpoints are Internet Protocol (IP) telephones.

19. The apparatus of claim 17, wherein one or more of the endpoints are Layer 3 routers.

20. The apparatus of claim 17, wherein each report from an endpoint indicates a number of faulty signaling packets received at the endpoint over the course of a period of time preceding the report.

21. The apparatus of claim 17, wherein each report from an endpoint indicates a number of faulty signaling packets received at the interface over the course of a call that recently ended.

22. The apparatus of claim 17, wherein the call agent is operable to receive the reports in keep-alive messages from the endpoints.

23. A method comprising:
receiving by one or more computer systems, from a plurality of endpoints coupled to a network, reports of signaling-packet faults in signaling packets received at the endpoints, the signaling packets comprising Layer 3 data or Layer 2 data, the Layer 3 data comprising Internet Protocol (IP) headers, the Layer 2 data indicating quality of service (QoS) classifications of the signaling packets, the reports indicating deviations of one or more portions of the Layer 3 data or the Layer 2 data in the signaling packets from reference data residing at the endpoint prior to receipt of the signaling packets, the reference data comprising one or more portions of one or more proper IP headers or proper QoS classifications, the signaling-packet faults in the signaling packets suggesting one or more network-path faults in a network path that communicated the signaling packets to the interface;
generating by the one or more computer systems a record of the signaling-packet faults from the reports; and
storing by the one or more computer systems the record of the signaling-packet faults for analysis.

24. The method of claim 23, wherein one or more of the endpoints are Internet Protocol (IP) telephones.

25. The method of claim 23, wherein one or more of the endpoints are Layer 3 routers.

26. The method of claim 23, wherein each report from an endpoint indicates a number of faulty signaling packets received at the endpoint over the course of a period of time preceding the report.

27. The method of claim 23, wherein each report from an endpoint indicates a number of faulty signaling packets received at the interface over the course of a call that recently ended.

28. The method of claim 23, wherein receiving the reports comprises receiving the reports in keep-alive messages from the endpoints.

* * * * *